US006467701B2

(12) United States Patent
Martin

(10) Patent No.: US 6,467,701 B2
(45) Date of Patent: Oct. 22, 2002

(54) SHIELD CLEANING SYSTEM

(75) Inventor: Uwe Martin, Bebra (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/970,501

(22) Filed: Oct. 3, 2001

(65) Prior Publication Data

US 2002/0008160 A1 Jan. 24, 2002

Related U.S. Application Data

(63) Continuation of application No. 09/509,241, filed as application No. PCT/EP98/05915 on Sep. 17, 1998.

(30) Foreign Application Priority Data

Sep. 26, 1997 (DE) ........................................ 197 42 471

(51) Int. Cl.7 ............................... B05B 1/10; B60S 1/46

(52) U.S. Cl. ............................... 239/284.1; 239/284.2; 239/130; 239/132; 239/133; 239/135; 239/587.3; 239/587.4; 239/589.1

(58) Field of Search ........................... 239/284.1, 284.2, 239/130, 132, 133, 135, 587.1, 587.2, 587.3, 587.4, 587.5, 589, 589.1; 15/250.02, 250.03, 250.04

(56) References Cited

U.S. PATENT DOCUMENTS

| | | | | | |
|---|---|---|---|---|---|
| 2,114,558 | A | * | 4/1938 | Dismukes | 239/284.1 |
| 3,199,787 | A | * | 8/1965 | Oishei et al. | 239/284.1 |
| 3,820,716 | A | | 6/1974 | Bauer | |
| 5,327,614 | A | * | 7/1994 | Egner-Walter et al. | 15/250.04 |
| 5,749,525 | A | * | 5/1998 | Stouffer | 239/284.1 |
| 5,957,385 | A | * | 9/1999 | Suhring et al. | 239/284.1 |

FOREIGN PATENT DOCUMENTS

| | | |
|---|---|---|
| DE | 2534261 | 4/1976 |
| DE | 3039663 | 5/1982 |
| DE | 8905635 | 8/1989 |
| DE | 3935318 A1 * | 4/1991 |
| DE | 19641460 | 4/1998 |
| FR | 2162737 | 7/1973 |
| FR | 2752755 | 3/1998 |
| GB | 2121318 | 12/1983 |

* cited by examiner

*Primary Examiner*—Robin O. Evans
(74) *Attorney, Agent, or Firm*—Martin A. Farber

(57) ABSTRACT

A shield cleaning system has a fluidic nozzle body (5) which is connected to a nipple (1) for the supply of cleaning fluid. The nipple (1) has at least one holding part (2) for invariable fastening to a body part. At its end facing the fluidic nozzle body (5), the nipple (1) has a spherical head (4). The fluidic nozzle body (5) is held on the latter by means of a ball socket (6) sealingly, but so as to be pivotable on all sides and rotable about its longitudinal axis relative to the nipple (1).

6 Claims, 1 Drawing Sheet

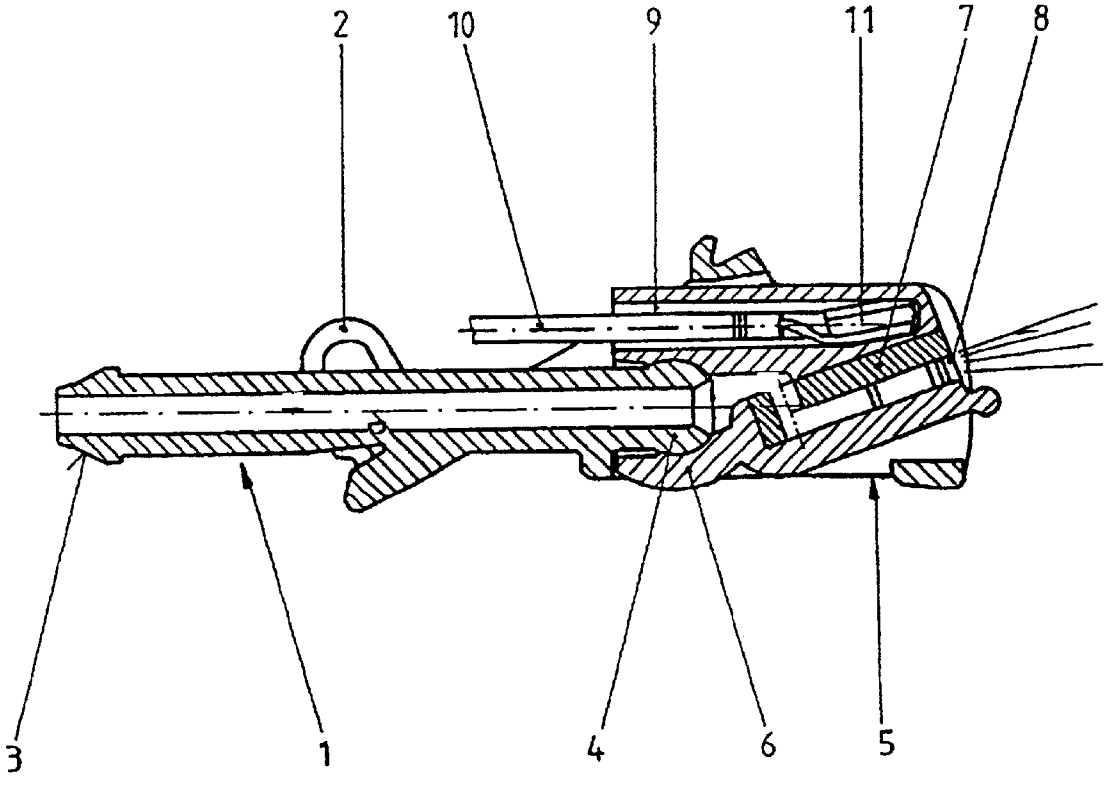
2
10
9
11
7
8
3
1
4
6
5

SHIELD CLEANING SYSTEM

RELATED APPLICATION

This is a Continuing Application of my copending application Ser. No. 09/509,241 filed Jun. 9, 2000 (PCT/EP98/05915 Filed Sep. 17, 1998) Under 35 USC 120, the entire contents of which is incorporated by reference herein.

FIELD AND BACKGROUND OF THE INVENTION

The invention relates to a shield cleaning system with a fluidic nozzle body which has a washing nozzle for spraying cleaning fluid and which possesses a nipple for connecting a line supplying cleaning fluid.

Shield cleaning systems of the above type are used in present-day motor vehicles, particularly for spraying the windshield, and are therefore generally known. In the known shield cleaning systems, the fluidic nozzle body is fastened to the vehicle body by means of holding parts. It becomes noticeable, in this case, that the body region in which the fluidic nozzle is fastened has the disadvantage of relatively coarse tolerances. The result of this is that the washing nozzle does not always have the necessary exact orientation in relation to the shield. This is a particularly serious disadvantage in shield cleaning systems in which the cleaning operation is carried out simply by spraying with the cleaning fluid, without subsequent wiping with a shield wiper, because, in such systems, the cleaning action requires a specific region to be sprayed with a great degree of accuracy.

Conventional washing nozzles are usually designed as a spherical head which is seated in a ball socket of a washing nozzle mounting and which, after mounting, can be oriented exactly in relation to the shield. Where increasingly popular fluidic nozzles are concerned, however, such a configuration would be highly complicated, because these must have a relatively large fluidic nozzle body which is not designed rotationally symmetrically.

SUMMARY OF THE INVENTION

The problem on which the invention is based is to design a shield cleaning system of the type initially mentioned, in such a way that it is possible to orient a fluidic nozzle body in as simple a way as possible.

This problem is solved, according to the invention, in that the nipple has at least one holding part for invariable fastening to a body part and, at its end facing the fluidic nozzle body, has a spherical head, and in that the fluidic nozzle body is held by means of a ball socket on this spherical head sealingly, but so as to be pivotable on all sides and rotable about its longitudinal axis relative to the nipple.

In such a shield cleaning system, instead of the fluidic nozzle body the nipple is fastened to a body part. This nipple is connected to the fluidic nozzle body by means of a ball joint. As a result, the fluidic nozzle body can be pivoted on all sides and additionally rotated about its axis running in the direction of the ejected fluid jet. The latter feature is advantageous when the washing nozzle has an elongate spraying region which has to be oriented as accurately as possible in the direction of the main extent of a shield to be sprayed.

The mounting of the shield cleaning system can be carried out particularly quickly if the ball socket is designed as an elastic component capable of being snapped onto the spherical head. Such an embodiment also makes it possible for the nozzle body to be exchanged quickly, for example if heating provided in it is defective.

The heating which is often provided in present-day washing nozzles and prevents freezing in the event of frost can be implemented in a simple way, in the shield cleaning system according to the invention, in that the fluidic nozzle body has, above its ball socket, a cable duct with an electric cable, and in that an electric heating element is provided within the fluidic nozzle body above a fluidic element.

BRIEF DESCRIPTION OF THE DRAWING

The invention permits various embodiments. One of these is illustrated in longitudinal section in the drawing and is described below.

DETAILED DESCRIPTION OF THE PREFERRED EMBODIMENT

The drawing shows a nipple 1 which, on one side, has holding parts 2 for immovable fastening to a body part not shown.

At its end on the left, as seen in the drawing, the nipple 1 has a cone 3 which serves for pushing on a hose, likewise not illustrated, for the supply of cleaning fluid. At its other end, the nipple is provided with a spherical head 4. A fluidic nozzle body 5 engages via this spherical head 4 with a ball socket 6. The latter is designed elastically, so that the fluidic nozzle body 5 can be pushed onto the spherical head 4 and, by virtue of the elasticity, remains held sealingly on the latter, but at the same time pivoting on all sides and rotation about the longitudinal axis of the nipple 1 are possible.

A fluidic element 7 is arranged in the fluidic nozzle body 5. The cleaning fluid supplied via the nipple 1 sprays out of the fluidic nozzle body 5 from a washing nozzle 8.

A cable duct 9 runs within the fluidic nozzle body 5 above the ball socket 6, a cable 10 leading through said cable duct to a heating element 11. Electric heating of the washing nozzle 8 and of the entire fluidic nozzle body 5 is thereby possible.

What is claimed is:

1. A shield cleaning system comprising a fluidic nozzle body which has a washing nozzle (8) comprising a non-spherical fluidic nozzle (7), for spraying cleaning fluid, and a nipple for connecting a line supplying cleaning fluid, wherein the nipple (1) has at least one holding part (2) for immovable fastening said nipple to a body part and, said nipple at an end thereof facing the fluidic nozzle body (5), has a spherical head (4), and wherein the fluidic nozzle body (5) has arranged thereon a ball socket (6) and is entirely held by said ball socket (6) on said spherical head (4) sealingly, and is pivotable on all sides and rotatable about its longitudinal axis relative to the nipple (1).

2. The shield cleaning system as claimed in claim 1, wherein the ball socket (6) is an elastic component snapable onto the spherical head (4).

3. The shield cleaning system as claimed in claim 1, wherein the fluidic nozzle body (5) has, above said ball socket (6) and parallel to said nipple, a cable duct (9) with an electric cable (10), and wherein an electric heating element (11) connected to said electric cable is provided within the fluidic nozzle body (5) above a fluidic element (7) of said fluidic nozzle upstream of a nozzle thereof.

4. The shield cleaning system as claimed in claim 1, wherein the shield cleaning system is for a motor vehicle having said body part.

5. The shield cleaning system as claimed in claim 1, wherein the washing nozzle has an elongate spraying region which is accurately orientable in direction of a main extent of an object to be sprayed on said body part, by the fluidic nozzle boby being rotatable about its longitudinal axis running in direction of the ejected fluid jet being sprayed.

6. A shield cleraning syatem as claimed in claim 2, wherein the non-spherical fluidic nozzle (5) in cross-section extends linearly toward a front of the nozzle body terminating in a projecting nose forming between the nose and the elastic ball socket (6) a region of said nozzle body, wherein in said region of the nozzle body the non-spherical fluidic nozzle (7) is is disposed, the fluidic nozzle (7) being formed with fluidic (oscillating jet) chambers, said chambers terminating at the front in the washing nozzle (8) communicating with the ambient, and at a rear opening of the chambers communicating with said nipple, said chambers extending linearly along a linear extent of the nozzle body and at the rear the rear opening extending angularly with respect to the linear extent of the nozzle body, the projecting nose being adapted for manual adjectment of the fluidic nozzle (7) and the washing nozzle (8) in the nozzle body (5) without any tools.

* * * * *